United States Patent [19]

Dailey

[11] 4,221,043
[45] Sep. 9, 1980

[54] AUTOMATIC TOOL CHANGER FOR MULTIPLE SPINDLE MACHINE TOOL

[75] Inventor: Frank E. Dailey, Milwaukee, Wis.

[73] Assignee: Kearney & Trecker Corporation, West Allis, Wis.

[21] Appl. No.: 17,708

[22] Filed: Mar. 5, 1979

[51] Int. Cl.³ ............................................ B23Q 3/157
[52] U.S. Cl. ..................................................... 29/568
[58] Field of Search ................... 29/568, 55, 33 P, 50; 414/730, 736; 408/35

[56] References Cited

U.S. PATENT DOCUMENTS

| | | | |
|---|---|---|---|
| 3,188,736 | 6/1965 | Brainard et al. | 29/568 |
| 3,256,600 | 6/1966 | Swanson et al. | 29/568 |
| 3,414,967 | 10/1968 | Erikson | 29/568 |
| 3,442,175 | 5/1969 | Heap et al. | 29/568 X |
| 3,571,912 | 3/1971 | Kielma | 29/568 |
| 4,168,567 | 9/1979 | Leguy | 29/568 |

FOREIGN PATENT DOCUMENTS

| | | | |
|---|---|---|---|
| 2012531 | 9/1971 | Fed. Rep. of Germany | 29/568 |
| 2739534 | 3/1979 | Fed. Rep. of Germany | 29/568 |
| 2847683 | 5/1979 | Fed. Rep. of Germany | 29/568 |
| 1316051 | 5/1973 | United Kingdom | 29/568 |

*Primary Examiner*—William R. Briggs
*Attorney, Agent, or Firm*—Cyril M. Hajewski

[57] ABSTRACT

Two pairs of crossed tool change arms are mounted adjacent to four spindles which are rotatably mounted on a common spindlehead. Each pair of crossed tool change arms is mounted on a common shaft which is rotatable and is movable along its axis and is positioned to simultaneously insert a pair of tools into or remove a pair of tools from the corresponding pair of spindles. A tool storage chain carrying a plurality of tool storage sockets is movably mounted on a frame in position to interact with the tool change arms which are operable to transfer tools from the tool storage sockets to the spindles and vice versa. Each tool storage socket is pivotally mounted for movement between a vertical storage position and a horizontal tool change position. Four tool storage sockets are pivoted from the vertical storage position to the horizontal tool change position for each tool change operation.

13 Claims, 13 Drawing Figures

AUTOMATIC TOOL CHANGER FOR MULTIPLE SPINDLE MACHINE TOOL

BACKGROUND OF THE INVENTION

This invention relates to an automatic tool changer for a multiple spindle machine tool.

One illustrative prior art tool changer for a multiple spindle machine tool is disclosed in U.S. Pat. No. 3,571,912 which issued on Mar. 23, 1971, to Ervin J. Kielma, for a "MULTITOOL TOOL CHANGER".

U.S. Pat. No. 3,571,912 discloses a machine tool having three spindles rotatably mounted on a common spindlehead. The automatic tool changer for the three spindleheads transfers three tools at a time between the spindleheads and the tool storage magazine. The tool storage magazine includes three endless chains which each carry a plurality of tool storage sockets. Each endless chain is entrained in a vertical path of motion around an upper and lower socket. All of the upper sockets are mounted on a common shaft and all of the lower sockets are mounted on a common shaft so that the tool storage chains all move in unison to bring three tools into the ready position simultaneously for transfer to the three spindleheads. The three tools in the ready position are simultaneously transferred to the spindles by three parallel tool arms which are joined together by a common transverse member. Each tool arm has a tool gripper at each end and can simultaneously grip a tool in one of the ready positions and a tool in one of the spindles. The three tool change arms are simultaneously rotated through 180° to interchange the tools in all six tool grippers. The interchanged tools are then simultaneously inserted into their respective spindles and tool storage sockets.

The principal object of this invention is to provide an automatic tool changer for a multiple spindle machine tool in which a single tool storage magazine serves to store all of the tools for all of the spindles thereof.

Another object of this invention is to provide an automatic tool changer for a multiple spindle machine tool which has a simpler tool change arm mechanism than those previously known in the art.

Other objects and advantages of the invention will be apparent from the description herein.

SUMMARY OF THE INVENTION

In accordance with this invention, the foregoing objects are attained by providing a plurality of crossed tool change arms which are mounted on a common shaft in position to be simultaneously moved into operative relationship with all of the tools in a multiple spindle machine tool. A single tool storage magazine is mounted on the machine tool in position to interact with the crossed tool change arms so that one tool can be simultaneously transferred to or received from each tool change arm. A tool gripper is provided on each end of every tool change arm for gripping the tools carried thereby. The tools in the tool storage magazine are arranged in spaced interspersed relationship so that a predetermined set of tools can be simultaneously removed from the tool storage magazine by the crossed tool change arms. The common shaft of the tool change arms is mounted for rotation about the axis of the shaft and for axial movement along the axis of the shaft. The tool change arms and spindles are all mounted on the spindlehead.

DETAILED DESCRIPTION OF THE INVENTION

Figure 1:
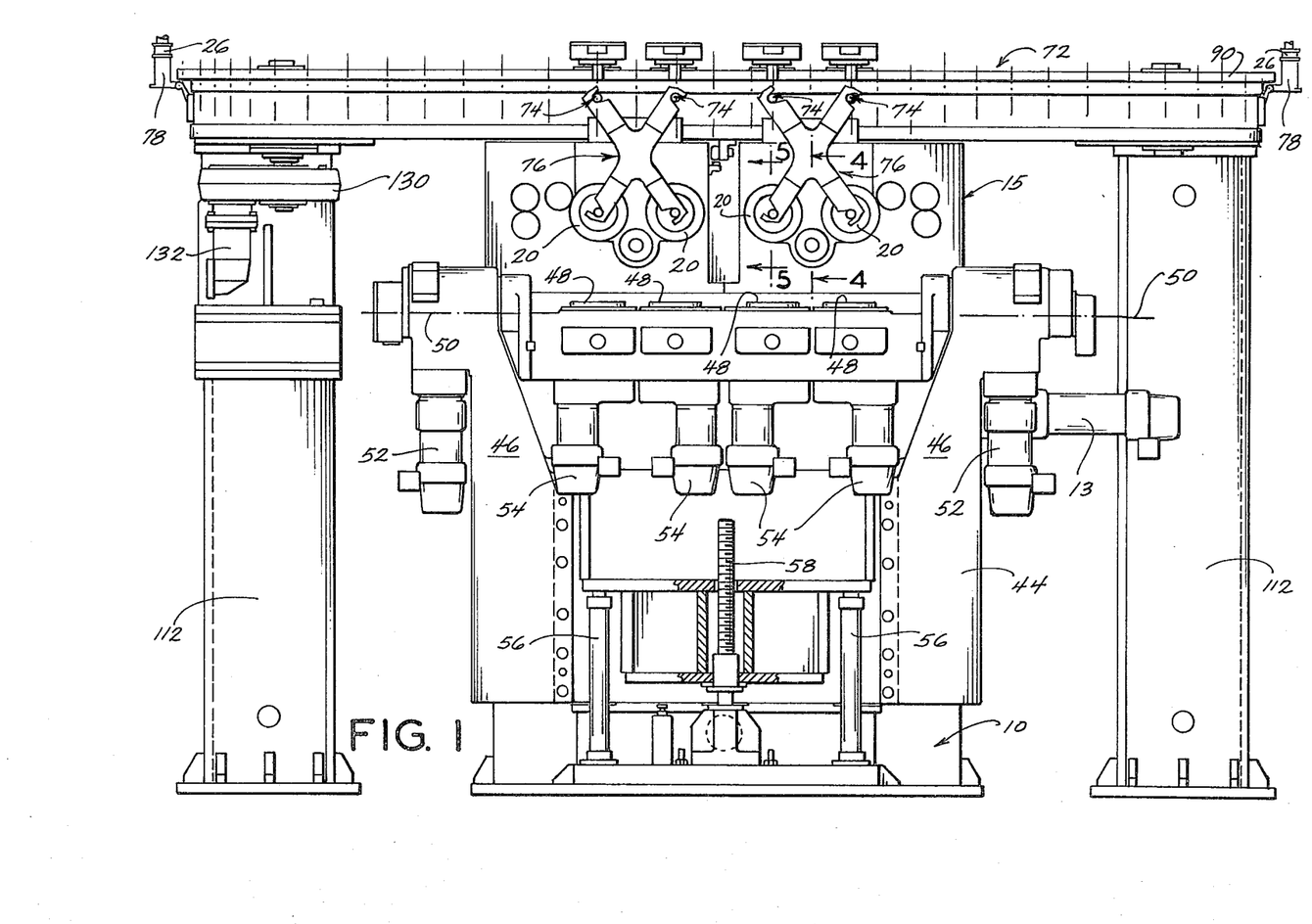
FIG. 1 is a front elevational view of one embodiment of the invention.
Figure 2:
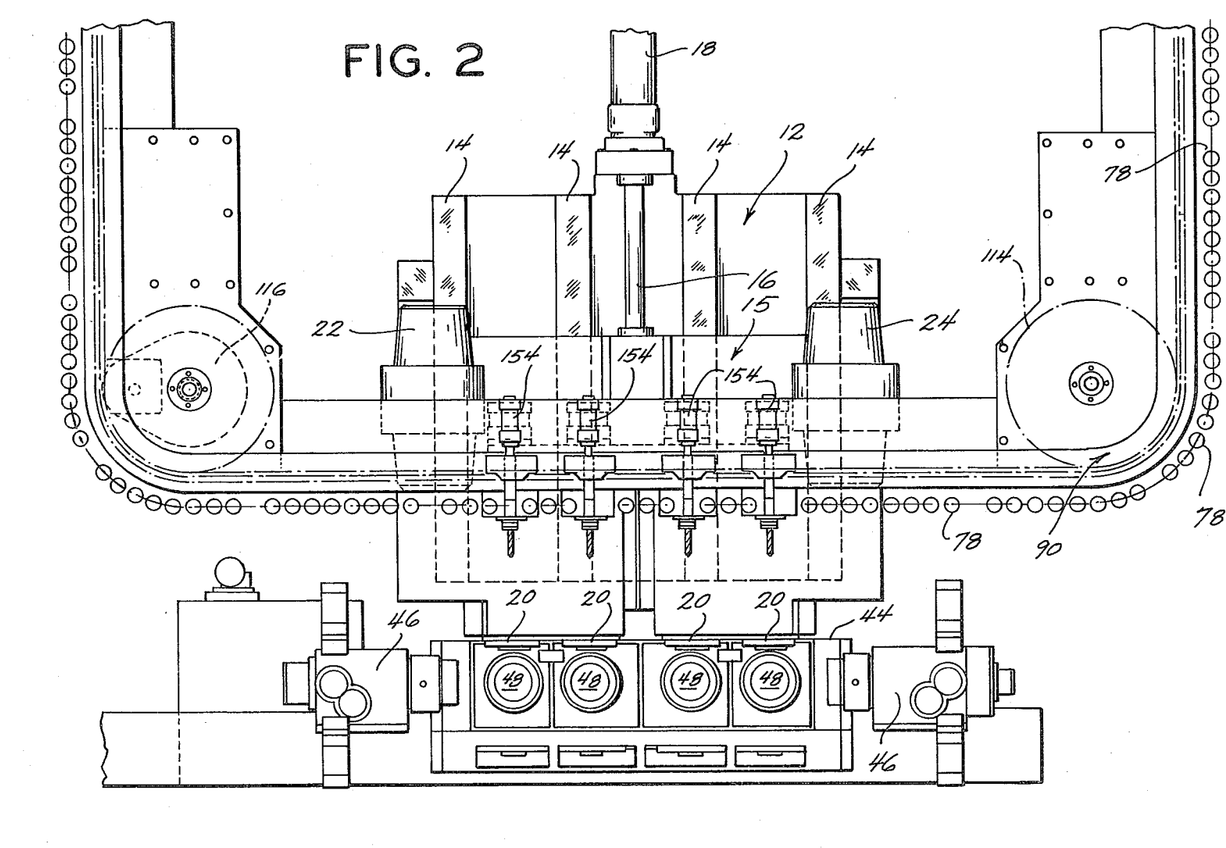
FIG. 2 is a plan view of the embodiment of FIG. 1.
Figure 3:
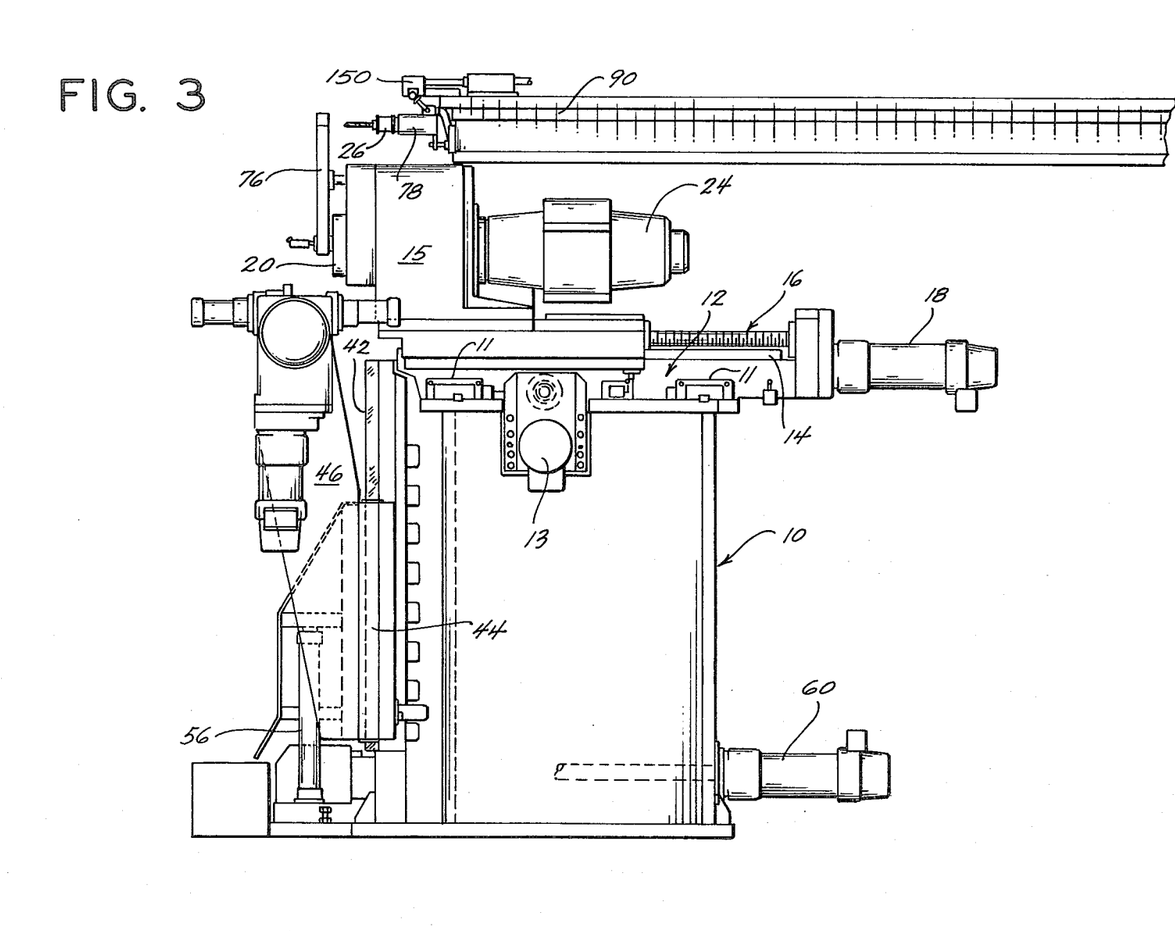
FIG. 3 is a side elevational view of the embodiment of FIGS. 1 and 2.

FIGS. 1 to 13 illustrate one preferred embodiment of the invention. Referring to FIGS. 1, 2 and 3, this embodiment of the invention includes a bed 10 (FIG. 3) which has a pair of horizontal X-axis ways 11 on its upper surface. A saddle 12 is slidably mounted on ways 11 for movement along the X-axis. Saddle 12 is moved along X-axis ways 11 by a conventional ballscrew drive (not shown) which is driven by an electric motor 13. The operation of motor 13 is controlled by a conventional numerically controlled servo system (not shown).

A set of horizontal Z-axis ways 14 (FIG. 2) are formed on top of saddle 12. A spindlehead 15 is slidably mounted on ways 14 for movement along the Z-axis. Spindlehead 15 is moved along ways 14 by a conventional ballscrew drive 16 which is turned by an electric motor 18. Motor 18 is controlled by a conventional numerically controlled servo system (not shown) so as to move spindlehead 15 to any desired position along Z-axis ways 14.

Figure 5:
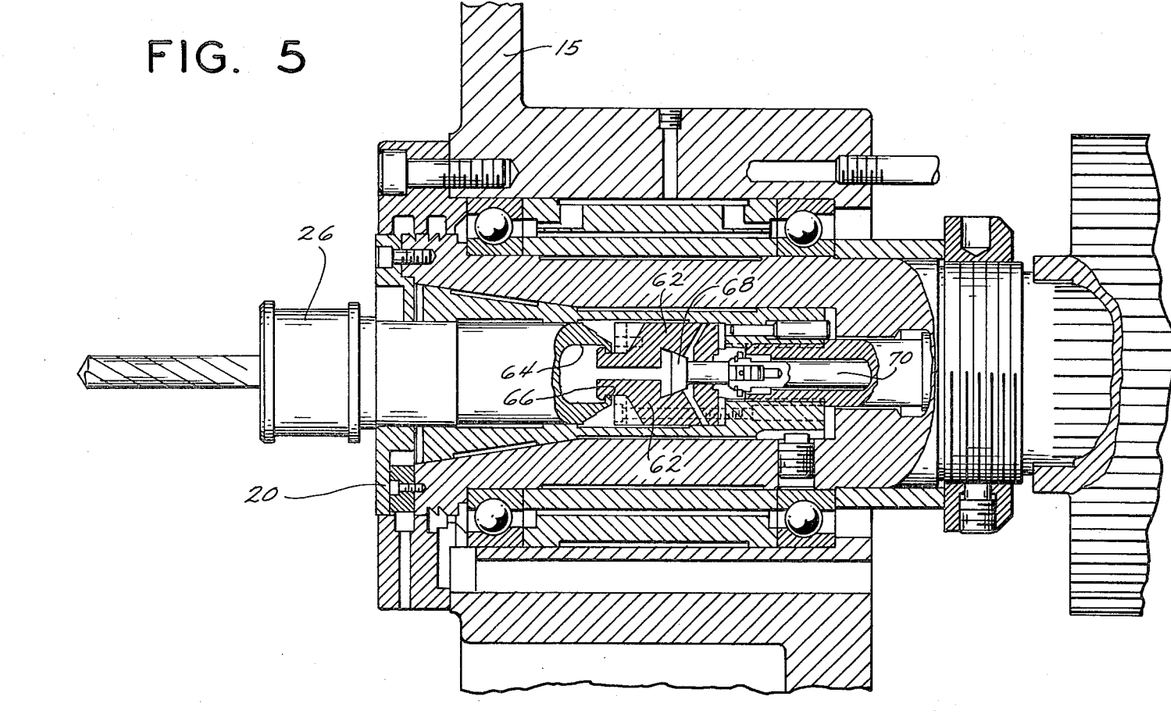
FIG. 5 is a longitudinal sectional view taken on the line 5—5 of FIG. 1.

Four conventional spindles 20 are rotatably mounted on spindlehead 15 by conventional means (FIG. 5). The two spindleheads 20 on the left-hand side of FIG. 1 are simultaneously rotated by an electric motor 22 (FIG. 2) through a conventional gear train (not shown) and the two spindles 20 on the right-hand side of FIG. 1 are simultaneously rotated by an electric motor 24 (FIG. 2) through another conventional gear train (not shown). Each of the spindles 20 includes a conventional clamp (FIG. 5) for receiving and holding a conventional cylindrical shank toolholder 26. The clamp includes a pair of clamp jaws 62 which are shaped to enter a recess 64 in toolholder 26 and engage a rear flange 66 thereon. Clamp jaws 62 can be moved radially toward each other or away from each other by axial movement of a tapered cam plug 68 which is mounted on the front end of an axially movable clamp shaft 70. Forward movement of shaft 70 causes clamp jaws 62 to move radially toward each other and release toolholder 26, while rearward movement of shaft 70 causes clamp jaws 62 to move radially away from each other and clamp toolholder 26 in spindle 20.

Figure 4:
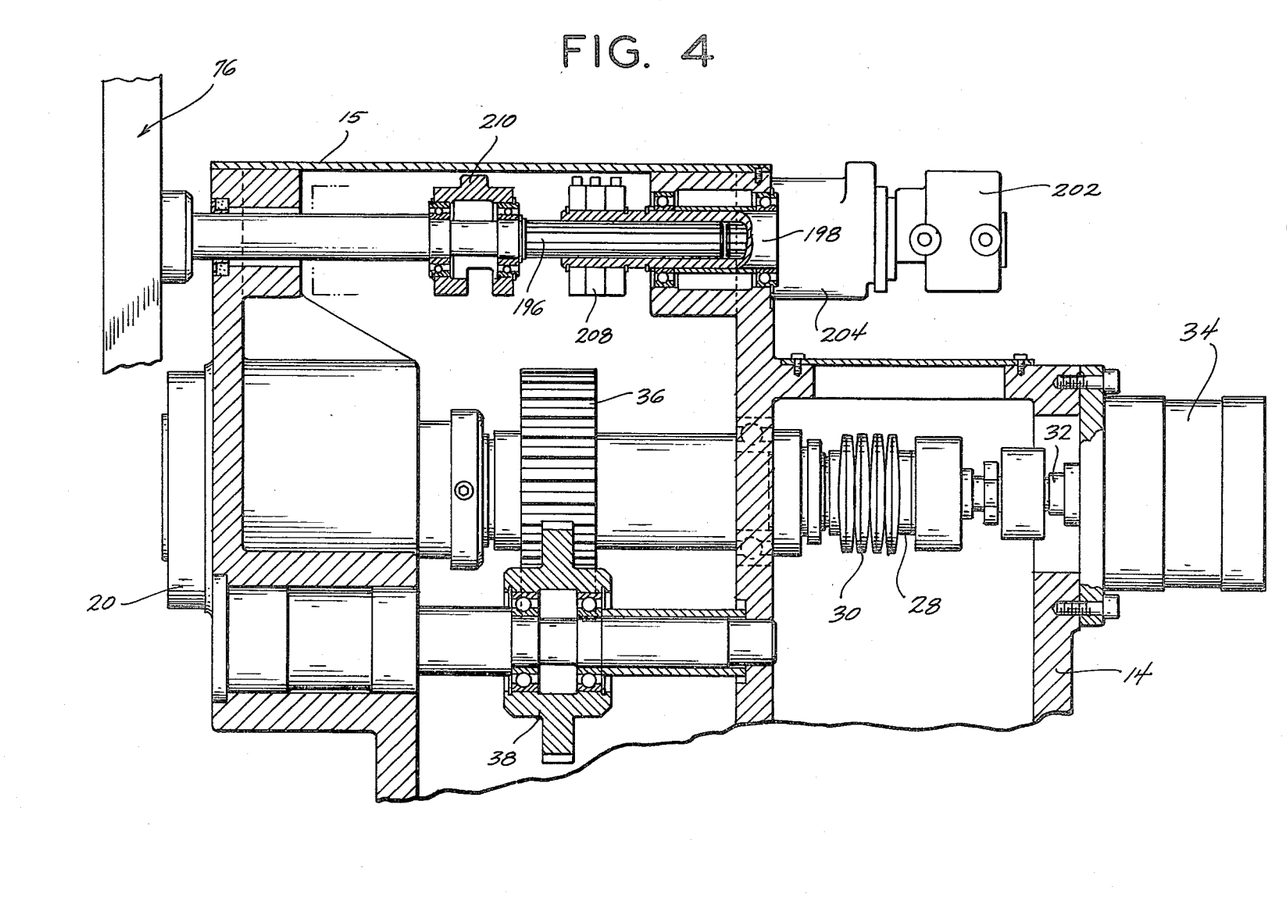
FIG. 4 is a longitudinal sectional view taken on the line 4—4 of FIG. 1.

Referring to FIG. 4, a collar 28 is attached to the rear end of clamp shaft 70 and is spring biased rearwardly by Belleville springs 30 to normally hold clamp jaws 62 in their clamped position. To move clamp jaws 62 to their unclamped position, collar 28 and shaft 70 are moved forward by the piston 32 of a hydraulic cylinder and piston mechanism 34 which is mounted on spindlehead 14 behind spindle 20.

Two gears 36 and 38 which are part of the spindle drive train are shown in FIG. 4, but the remaining gears in the spindle drive train are omitted since the drive train is conventional in structure and does not interact with the automatic tool changer of this invention.

Bed 10 also supports a set of vertical Y-axis ways 42 upon which a worktable saddle 44 slidably mounted for vertical movement. A pair of support arms 46 are attached to saddle 44 and a set of four worktables 48 (FIG. 1) are pivotally mounted on arms 46 for rotation about a common horizontal A-axis 50 between a horizontal position shown in the drawings, and a vertical position perpendicular to the position shown in the drawings. The motive power for rotation of worktables 48 around A-axis 50 (FIG. 1) is supplied by two electric motors 52 (FIG. 1) through conventional gearing (not shown).

Each worktable 48 is individually indexable around its own vertical B-axis by an electric motor 54 (FIG. 1) along with conventional gearing (not shown).

Worktable saddle 44 is continuously urged upwardly by a pair of hydraulic piston and cylinder mechansims 56 which apply enough upward force to counterbalance the weight of saddle 44, support arms 46, worktables 48, motors 54, and their associated parts. Worktable saddle 44 is driven up and down to the desired position along the Y-axis by a ballscrew drive 58 which is rotated by an electric motor 60 (FIG. 3) through a conventional gear train (not shown). The details of the worktable saddle drive are omitted since it is conventional in structure and do not interact with the automatic tool changer of this invention. The indexing mechanism for the individual worktables 48 and the control circuits for the various motors are omitted for the same reason.

Referring to FIG. 1, the major portions of the automatic tool changer in this embodiment include a tool storage magazine 72 which has four ready stations 74 at which toolholders 26 can be transferred to and from storage magazine 72 by two crossed tool change arm assemblies 76. Each of the toolholders 26 are stored in a separate tool socket 78 (FIGS. 10 and 11) which is pivotally mounted on a tool storage chain 80. Tool storage chain 80 is made up of links 82 which are pivotally linked together by pivot pins 84 which fit through interleaved bushings 86 in the side edges of links 82. Three rollers 88 are rotatably mounted on each pivot pin 84 in position to roll over matching surfaces of a guide channel 90 (FIG. 11) which is made up of a vertical backplate 92 (FIG. 11), a horizontal bottom plate 94, a horizontal top plate 96, a pair of vertical front plates 98 and 100, a horizontal divider plate 102, and two spacer plates 104 and 106. Two additional rollers 108 and 110 are attached to each link 82 in position to roll along the upper and lower surfaces of divider plate 102.

Referring to FIG. 1, the plates which make up tool storage guide channel 90 are supported by four posts 112, two of which are visible in FIG. 1. Tool storage guide channel 90 is rectangular in plan shape (FIG. 2) with rounded corners at which sprockets 114 and 116 engage the links 82 of tool storage chain 80. Only half of guide channel 90 is shown in FIG. 2, but it will be understood that the half not shown is similar to the half shown.

Figures 12, 13:
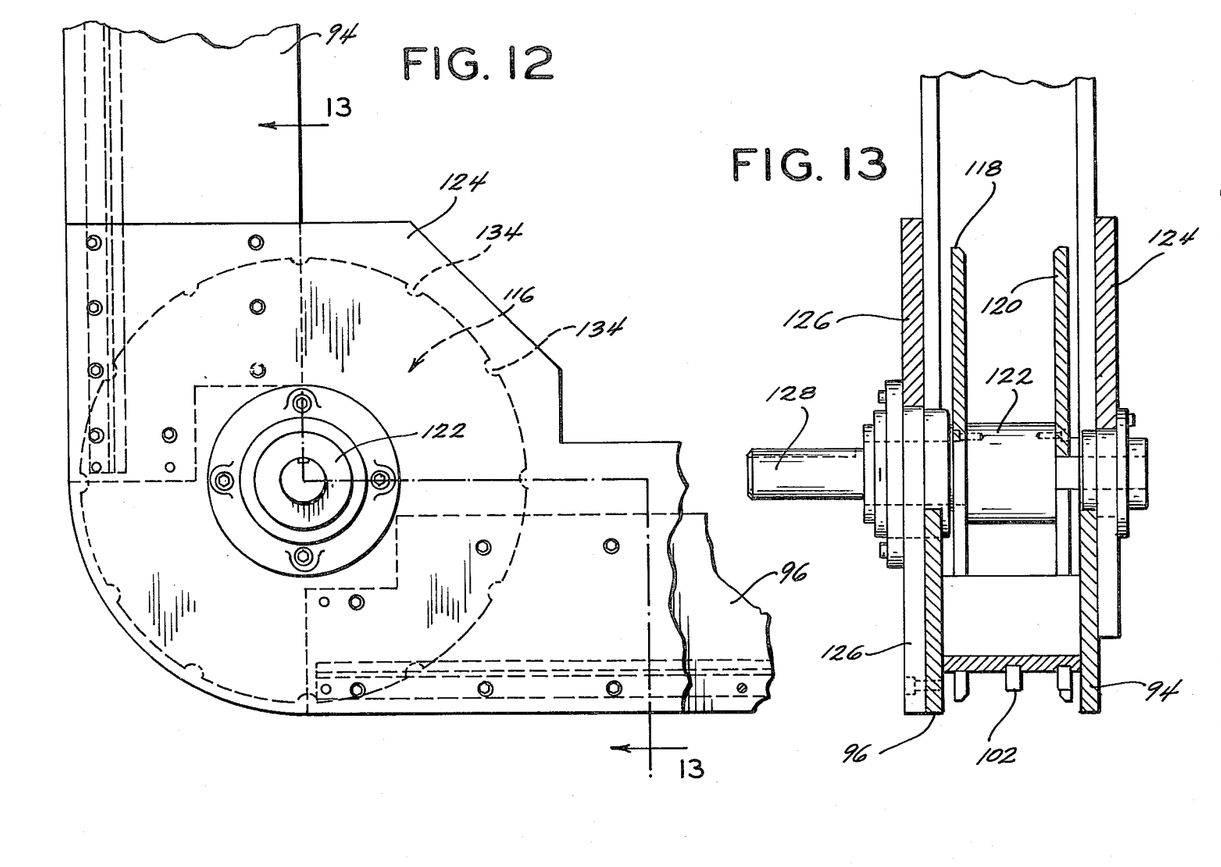
FIG. 12 is an enlarged plan view of one corner of the tool storage magazine showing the tool chain drive sprocket.
FIG. 13 is a cross-sectional view taken on the line 13—13 of FIG. 12.

Tool storage chain 80 is driven around guide channel 90 by a drive sprocket 116 which is shown in FIGS. 12 and 13. Drive sprocket 116 includes two parallel discs 118 and 120 (FIG. 13) which are attached to a hub 122. Hub 122 is journalled to supporting plates 124 and 126 which are attached to the top plate 96 and bottom plate 94 of guide channel 90. A drive shaft 128 is connected to a reducing gear box 130 (FIG. 1) which is driven by an electric motor 132. As drive shaft 128 and sprocket discs 118 and 120 rotate, they drive tool storage chain 80 by means of circumferentially spaced semi-circular notches 134 (FIG. 12) which are spaced to engage the upper and lower rollers 88 of each chain link 82. Electric motor 132 is controlled by conventional electrical control circuits which are not shown.

Each tool storage socket 78 is pivotally attached to a chain link 82 by means of a pivot pin 136 (FIG. 10) which passes through a bore 138 in an arm 140 that extends forwardly from chain link 82. Each pivot pin 136 also passes through sleeves 142 in a bracket 144 on tool sockets 78. Two tool sockets 78 are pivotally attached to each chain link 82 at opposite side edges thereof. Tool storage sockets 78 can be pivoted between a horizontal position shown in solid lines in FIG. 11 and a vertical position shown in broken lines. The vertical position is the tool storage position and the horizontal position is the tool change position.

Figure 10:
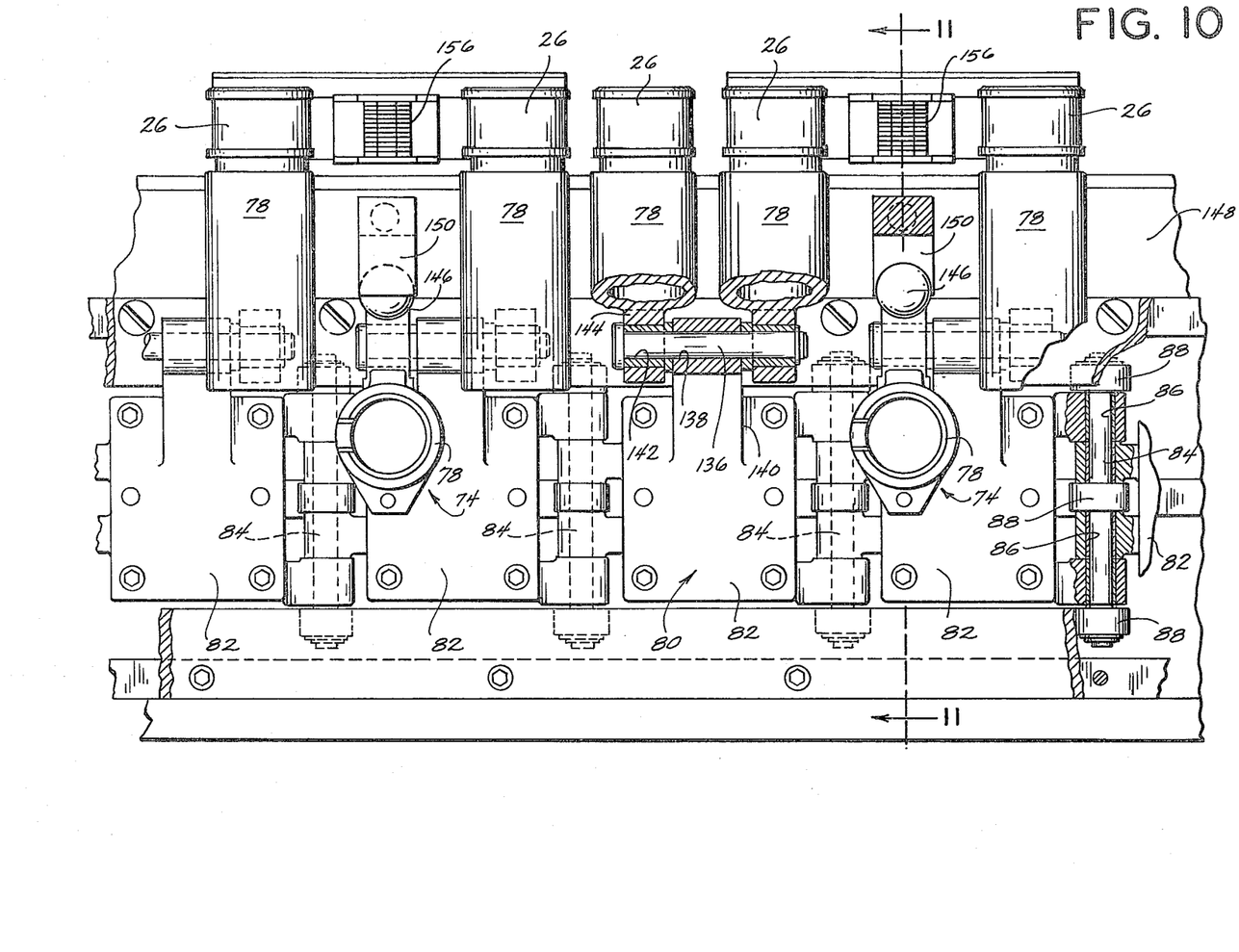
FIG. 10 is an enlarged front elevational view of a portion of the tool storage magazine chain extending between two tool ready stations.
Figure 11:
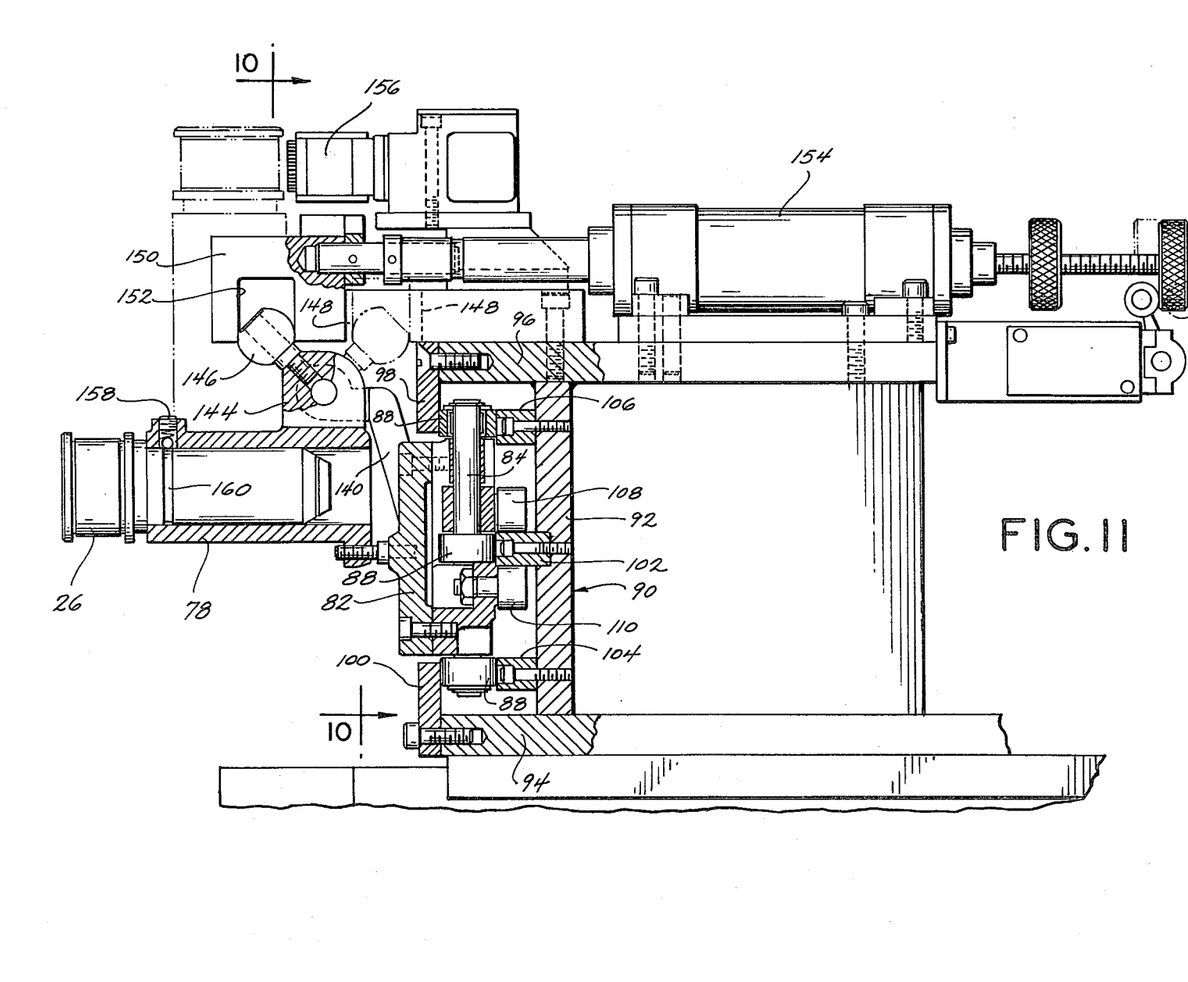
FIG. 11 is a cross-sectional view taken on the line 11—11 of FIG. 10.

A semispherical roller 146 (FIG. 11) is attached to bracket 144 of each tool storage socket 78 and engages a rectangular channel 148 (shown in broken lines in FIG. 11) which holds socket 78 in the vertical position all the way around guide channel 90 except at ready stations 74, at which positions channel 148 is open to permit sockets 78 to be pivoted to their horizontal tool change position. This pivoting is accomplished by a tilt slide 150 having a notch 152 at which engages roller 146. Tilt slide 150 is movable between a forward position shown in solid lines in FIG. 11 and a rear position shown in broken lines. In its rear position, tilt slide 150 holds tool storage socket 78 in the vertical position, and in its forward position, tilt slide 150 holds tool storage socket 78 in the horizontal position. Each tilt slide 150 is moved from its rear position to its forward position, and vice versa, by means of a hydraulic piston and cylinder mechanism 154 which is mounted on the top plate 96 of guide channel 90 at each ready station 74. FIG. 10 shows two ready stations 74 at which both sockets 78 are tilted to their horizontal tool change position. The remaining sockets 78 are held in their vertical tool storage position.

A conventional tool code reader 156 is mounted at each ready station 74 in position to sense the tool number which is encoded on the cylindrical shank toolholders 26 in the conventional manner. The circuitry for reading the tool numbers is conventional and hence is not disclosed herein.

Toolholders 26 are normally held in their respective tool sockets 78 by a spring loaded detent 158 (FIG. 11) which engages a groove 160 in toolholder 26. To remove toolholders 26 from sockets 78, enough axial force is applied to toolholder 26 to cause detent 158 to ride up over the edges of groove 160.

Figures 6, 7, 8:
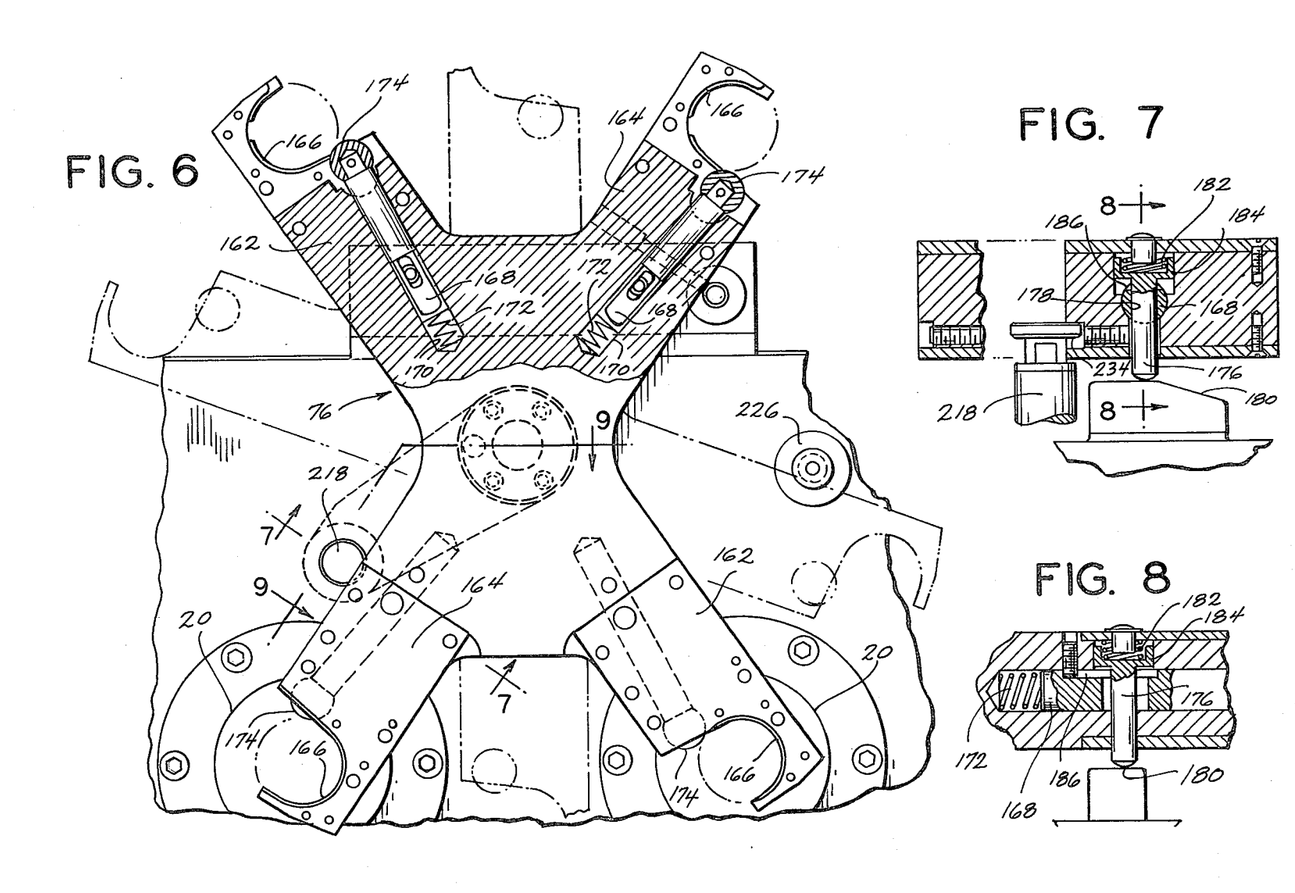
FIG. 6 is a front elevational view of one of the crossed tool change arms shown in FIG. 1.
FIG. 7 is a cross-sectional view taken on the line 7—7 of FIG. 6.
FIG. 8 is a cross-sectional view taken on the line 8—8 of FIG. 7 but at a reduced scale.

FIGS. 6 to 9 show the details of one of the tool change arms 76. Referring to FIG. 6, tool change arm 76 consists of two crossed, double-ended arms 162 and 164 which are joined together in their central portion. Tool receiving recesses 166 are provided on both ends of both arms 162 and 164 along with a spring loaded clamp assembly for clamping a toolholder 26 in recess 166.

The clamp assembly includes a plunger 168 which is axially movable in a bore 170 in the corresponding arm and is spring loaded for outward movement by a spring 172. A roller 174 is mounted on the end of plunger 168. When the tool change arm is rotated into contact with a toolholder 26 pressure on roller 174 moves plunger 168 inward and allows the toolholder to enter recess 166. When the toolholder 26 is fully inserted into recess 166, plunger 168 moves outward and clamps toolholder 26 in recess 166. As the tool change arm moves away from the point where it picked up toolholder 26, which is either a spindle 20 or a tool storage socket 78, a spring loaded latch pin 176 (FIGS. 7 and 8) which extends laterally through a slot 178 in plunger 168 rides down an inclined cam surface 180 (FIG. 7) to lock plunger 168 in its extended position to prevent toolholder 26 from falling out when the tool change arm assembly is rotated. (The scale in FIG. 8 is smaller than in FIG. 7). Latch pin 176 is spring loaded in the latched position by a spring 182 but is moved to the unlatched position as the bottom of latch pin 176 rides up cam surface 180 when the arm approaches a spindle 20 or a tool storage socket 78. The latching action occurs when a cup-shaped flange 184 on the top of latch pin 176 drops into a recess 186 in plunger 168. When latch pin 176 is lifted by cam surface 180, flange 184 is lifted above recess 186 and thus releases plunger 168 for movement.

Figure 9:
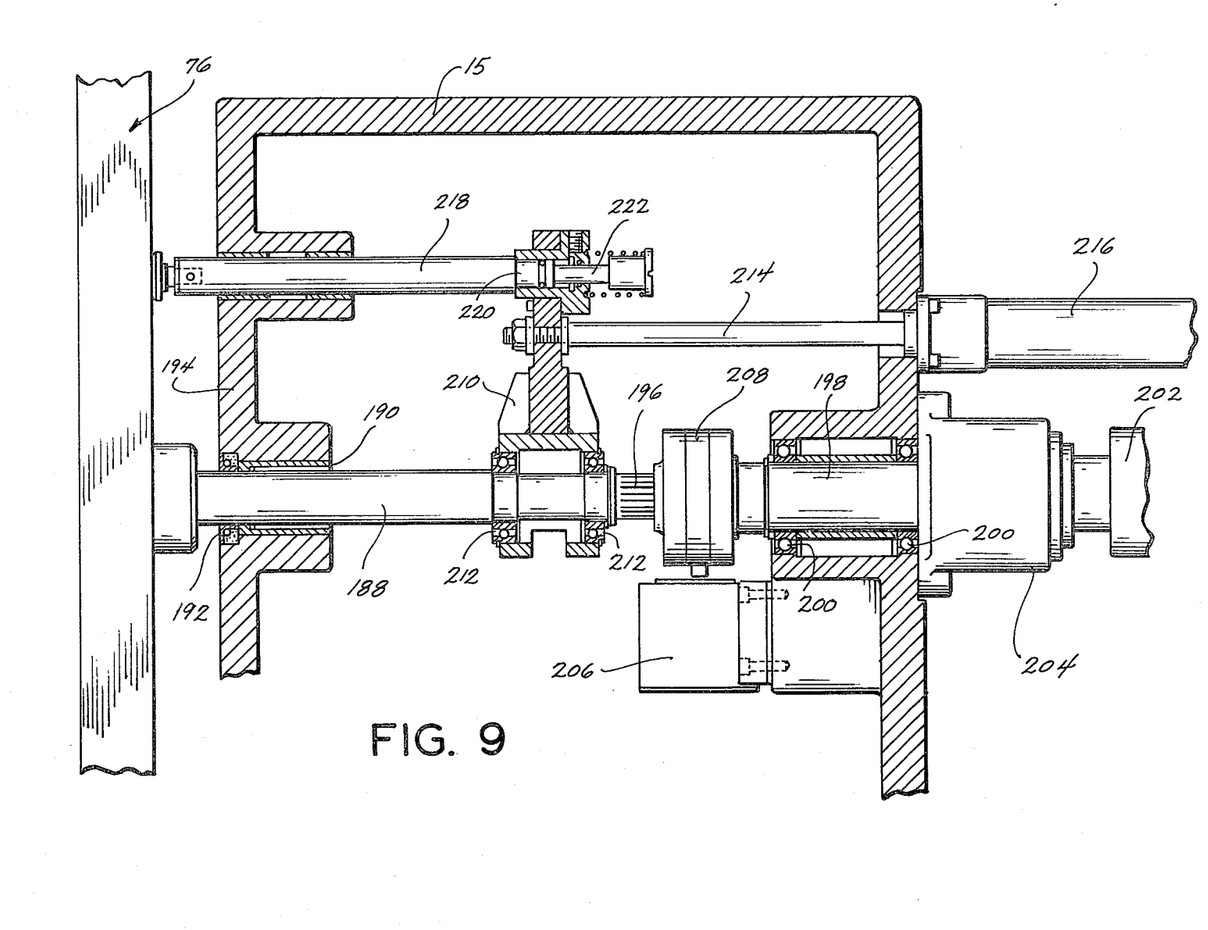
FIG. 9 is a longitudinal sectional view taken on the line 9—9 of FIG. 6.

As shown in FIG. 9, both tool change arms 162 and 164 of tool change arm assembly 76 are mounted on a common shaft 188 which is mounted in spindlehead 14 for rotary and axial movement. Shaft 188 extends through a bushing 190 and oil seal 192 on the front face 194 of spindlehead 15. Shaft 188 has a spindled rear portion 196 which fits telescopically into the splined interior of a hollow rotary drive shaft 198 (see FIG. 4). Drive shaft 198 is journalled within spindlehead 15 by bearings 200 and is rotated by a conventional hydraulic motor 202 through a conventional gear box 204. Drive shaft 198 can rotate shaft 188 when it is in the fully retracted position, shown in FIG. 9, or when it is in the fully extended position. A conventional rotary limit witch 206, which is actuated by a cam 208 on drive shaft 198, indicates when shaft 188 has reached either limit of its rotary movement.

Shaft 188 is moved axially by a yoke 210 which is journalled to shaft 188 by bearings 212. Yoke 210 is attached to the end of the piston rod 214 of a hydraulic piston and cylinder mechanism 216. A positive stop shaft 218 is also attached to the end of piston 214 and is extended outwardly with shaft 188. Stop shaft 218 is attached to the piston 220 of a hydraulic piston and cylinder mechanism 222 which is operable to extend stop shaft 218 outwardly to provide a positive stop for arm 164 as it approaches a spindle 20. As can be seen in FIG. 7, the outer end of stop shaft 218 is shaped to cooperate with a locating recess 234 in tool change arm 164.

A similar stop shaft 226 (FIG. 6) is provided to stop rotation of tool change arms 76 in the opposite direction of rotation.

The control circuits which control the rotation and extension of tool change arms 76, and which control the movements of tool storage chain 80, are conventional and hence are not disclosed herein. Even though each of the tool change arms 76 simultaneously engages four toolholders 26, the movements of the tool storage chain 80 and tool chain arms 76 are the same as if they were only engaging two toolholders 26. The only modification that is required by this invention is that the separation between the adjacent spindles 20 must be correlated with the spacing of the tool storage sockets 78 so that each tool change arm 76 can simultaneously grip two toolholders 26 in tool storage sockets 78 and two toolholders 26 in spindles 20. The spacing between the two pairs of spindles 20 must also be correlated with the spacing of tool storage sockets 78 if the tool change operations of the two tool change arms 76 is to be performed simultaneously. With these small modifications, standard controls can be used to effectuate the tool search and tool change cycles.

The tools in tool storage chain 80 are arranged in spaced interspersed relationship to form sets of four identical tools which can be simultaneously removed from tool storage chain 80 by the two crossed tool change arms 76. With the particular spacing of spindles 20 and tool change arms 76, shown in FIGS. 1, 2 and 6, the tools 26 are arranged in sets of four which are interspersed in accordance with the following sequence:

ABCDABCD space ABCDABCD where each letter designates a different type of tool. The space represents a skipped tool socket 78 and is inserted at each ninth tool socket space to account for the fact that tool change arms 76 are separated by a distance equal to the distance spanned by five tool storage sockets 78. If tool change arms 76 were spaced apart by a distance equal to the distance spanned by four tool storage sockets 78, there would be no need for the space.

With the above-noted tool spacing, each set of four spaced tools enters the four spaced ready stations 74 at the same time and are read by the four spaced tool readers 156 at the same time. As the above-noted sequence of tools passes tool readers 156, each tool reader 156 will produce the readings ABCD in sequence. If tool set A is desired, the tool storage chain 80 is stopped with the spaced tools A in the spaced ready stations 74. If tool set B is desired, the tool storage chain 80 is stopped with the spaced tools B in the spaced tool ready stations 74. With eight tools, the above-noted spacing would be as follows:

ABCDABCD space ABCDABCD
EFGHEFGH space EFGHEFGH

Thus, to use all of the tool sockets 78, the total number of tool sets would have to be a multiple of four. If the total were less than a multiple of four, some of the tool sockets 78 would have to be empty. For example, if ten sets of tools are stored in tool storage chain 80, the last I and J would be spaced as follows:

IJ empty empty IJ empty empty space
IJ empty empty IJ empty empty

Therefore, in this embodiment, the capacity of tool storage chain 80 is preferably selected from multiples of four, i.e., 4, 8, 12, 16, 20, 24, 28, 32, etc.

In order to achieve the above-described spacing of the separate tool sets A, B, C, D, E, F, G, H, etc., the spacing between the individual tool storage sockets 78 must be an integral divisor of the distance between adjacent spindles 20. For example, in this particular embodiment, the distance tween adjacent spindles 20 is 12 inches and the distance between adjacent tool storage sockets 78 is 3 inches. If the spacing between adjacent spindles 20 was 16 inches, the space between adjacent tool storage sockets 78 would have to be 4 inches. An 18 inch space between adjacent spindles 20 would require a 4.5 inch space between adjacent tool storage sockets 78.

Another way of looking at the spacing problem is to first choose the spacing between the equally spaced tool storage sockets 78 and then make the distance between adjacent spindles 20 equal to an integral multiple of the space between tool storage sockets 78. The space between spindles 20 must also be selected with regard to the spacing between the crossed tool change arms 162 and 164, which have to be spaced apart at their tool receiving recesses 166 by a distance equal to the spacing between adjacent spindles 20.

In this particular embodiment, the individual tools are arranged in sets of four which are associated together as a set to be used simultaneously in the four spindles 20. In general, the tools will be arranged in sets of N where N is the number of spindles on any particular embodiment.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. An automatic tool changer for a machine tool having a spindlehead and having a plurality of spindles mounted therein for rotation about spaced parallel axes, comprising:
   a plurality of crossed tool change arms mounted on a common tool change shaft for rotation about the axis of said shaft and for axial movement along the axis of said shaft;
   a tool gripper on each end of every tool change arm, said tool grippers, tool change arms and spindles being positioned to enable tools to be simultaneously inserted into or withdrawn from all of said spindles by the tool grippers on one end of each tool change arm;
   a tool storage magazine having a plurality of tool sockets for storing tools and having one ready station for each of said tool change arms, said ready stations being located to enable tools to be simultaneously inserted into or withdrawn from the tool sockets which are in said ready station by the tool grippers on one end of each tool change arm, said tool sockets being spaced apart by a distance which enables the tools to be arranged in spaced interspersed relationship so that a predetermined set of tools can be simultaneously removed from said tool sockets;
   means for moving each tool gripper into and out of engagement with the tool in the corresponding spindle or tool socket;
   means for moving said tool change shaft axially outwardly far enough to withdraw tools from said spindles and said tool sockets and for moving said tool change shaft axially inwardly far enough to insert tools into said spindles and tool sockets; and
   means for rotating said tool change shaft by 180° when it is in its outward position to interchange the ends of said tool change arms to transfer tools from said tool sockets to said spindles and from said spindles to said tool sockets.

2. An automatic tool changer according to claim 1 wherein said tool storage magazine includes an endless chain having interconnected links;
   means for supporting said chain and for moving said chain through said ready stations; and
   each of said tool sockets being attached to a corresponding link of said chain.

3. An automatic tool changer according to claim 2 wherein each tool socket is pivotally attached to the corresponding chain link for movement between a storage position in which the axis of said tool socket is perpendicular to the axis of said tool change shaft and a tool change position in which the axis of said tool socket is parallel to the axis of said tool change shaft.

4. An automatic tool changer according to claim 3 and also including means at each ready station for pivoting the tool socket at said ready station between its storage position and its tool change position.

5. An automatic tool changer according to claim 4 wherein the axes of said spindles are each parallel to the axis of said tool change shaft.

6. An automatic tool changer according to claim 3 and further comprising:
   a semi-spherical roller rotatably attached to each tool socket;
   means defining a first guide channel which cooperates with said roller to maintain said tool socket in its storage position except when it is in one of said ready positions; and
   means at each ready station for engaging said roller and moving said roller so as to pivot the corresponding tool socket from its storage position to its tool change position.

7. An automatic tool changer according to claim 6 and also including a plurality of cylindrical rollers rotatably mounted on each chain link; and
   means defining a second guide channel which cooperates with said cylindrical rollers to guide said chain in its path of movement.

8. An automatic tool changer according to claim 1 wherein there are two spindles and two crossed tool change arms.

9. An automatic tool changer according to claim 1 wherein each tool gripper comprises:
   a recess on each end of each tool change arm, each recess being dimensioned to accept a tool; and
   clamp means on each end of each tool change arm for clamping said tool in said recess.

10. An automatic tool changer according to claim 9 and further comprising:
    means for latching each of said clamp means when said tool change arms are rotated; and
    means for unlatching said clamp means when said tool change arms approach a spindle or a tool socket.

11. An automatic tool changer according to claim 1 wherein said tool sockets are equally spaced by a distance which is an integral divisor of the distance between adjacent spindles.

12. An automatic tool changer according to claim 1 wherein said tool sockets are equally spaced and wherein adjacent spindles are spaced apart by a distance which is an integral multiple of the space between adjacent tool sockets.

13. An automatic tool changer according to claim 1 wherein there are four spindles and two sets of crossed tool change arms which each have two crossed tool change arms and four tool grippers, and wherein said tools are arranged in interspersed sets of four in accordance with the sequence ABCDABCDABCDABCDEFGHEFGHEFGHEFGHEFGH, etc., where each letter represents a different type of tool and the four tools having the same letter are associated together as a set to be used simultaneously in said four spindles.

* * * * *